No. 11,722. Reissued Mar. 14, 1899.

C. GULLAND.

VALVE.

(Application filed Jan. 7, 1898.)

Attest
C. A. Wimmelton
Wm. F. Hall.

Inventor
Charles Gulland
by Walter Donaldson & Co
Attys.

UNITED STATES PATENT OFFICE.

CHARLES GULLAND, OF PITTSBURG, PENNSYLVANIA, ASSIGNOR, BY DIRECT AND MESNE ASSIGNMENTS, OF THREE-FOURTHS TO MARK McDANIEL AND J. E. COURSON.

VALVE.

SPECIFICATION forming part of Reissued Letters Patent No. 11,722, dated March 14, 1899.

Original No. 608,454, dated August 2, 1898. Application for reissue filed January 7, 1899. Serial No. 701,534.

*To all whom it may concern:*

Be it known that I, CHARLES GULLAND, a citizen of the United States, residing at Pittsburg, county of Allegheny, and State of Pennsylvania, have invented certain new and useful Improvements in Valves, of which the following is a specification.

My invention relates to the class of valves as illustrated in Letters Patent of the United States granted to me on the 7th of December, 1897, No. 595,061.

It is the object of the present invention to improve the construction shown in the patent referred to and to produce a valve which can be closed automatically with a pressure equal on each side, so as to avoid any reaction on the pipes connected therewith.

In the accompanying drawings I have illustrated my invention, in which—

Figure 1:
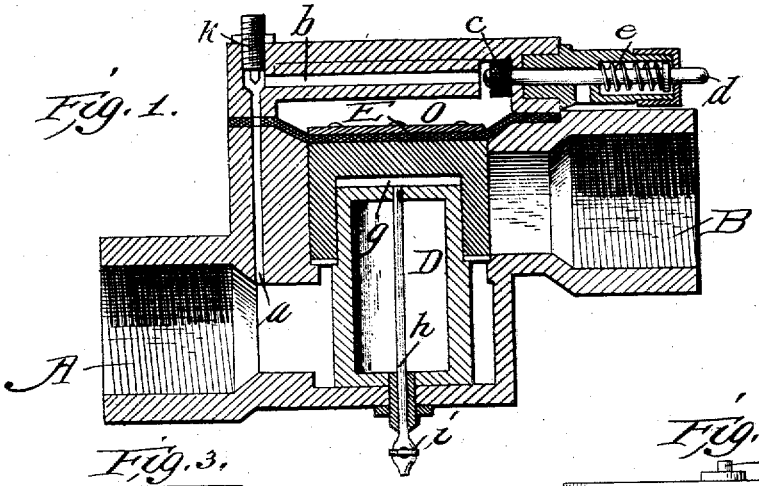
Figure 3:
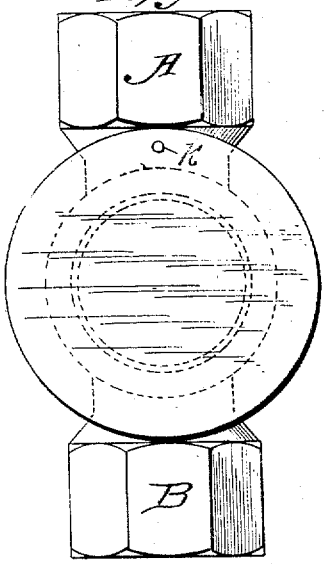
Figure 2:
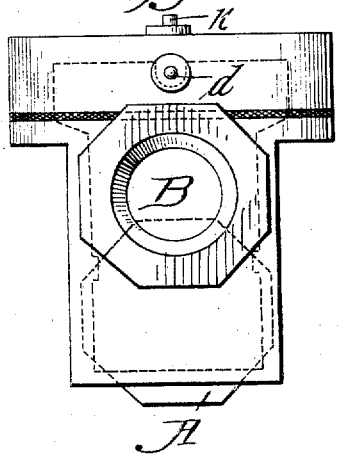
Figure 4:
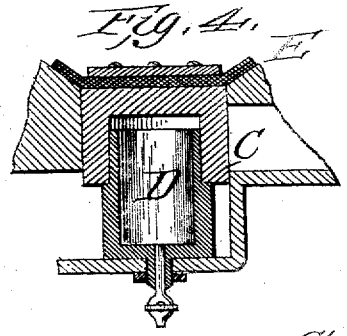

Figure 1 is a sectional view of the valve. Fig. 2 is a front view, and Fig. 3 a rear view, of the coupling containing the operating parts. Fig. 4 is a sectional view of a modification.

The invention is adapted for use on railway stand-pipes, water-plugs, and fire-hydrants and is also capable of use where water is run to a tank with a ball-float to operate the supplemental valve.

In the drawings, A represents the inlet-passage, and B the outlet-passage. In a chamber made intermediate of the inlet and outlet passage is a piston D, and covering this piston is a cylindrical cap C, which is secured to a diaphragm E, the edges of which are clamped between parts of the casting, as shown in Fig. 1. It will be observed that by the use of the cylindrical cap connecting with the diaphragm there is a bearing provided for the entire surface of the diaphragm, and there is no pressure upon unsupported parts, as in my former construction. Above the diaphragm is located a pressure-chamber O, and this is in communication with the inlet-port A through a passage *a*, which enters the pressure-chamber O through a horizontal continuation *b* of the passage *a*. A valve *c*, carried on a stem *d*, closes the opening of the pipe *b* in its abnormal position, but normally leaves the passage free, a spring *e* keeping the valve and stem retracted. Thus in its normal position the force of the water is exerted on the upper side of the diaphragm and keeps the exit-opening closed. The spindle *d* projects outside of this casing, and by forcing this in to close the exit-opening of the pipe *b* the flow of water above the diaphragm is stopped, and the pressure exerted against the under face of the cylindrical cap C will force this upward, and the water contained above the diaphragm will flow out from the chamber around the spindle *d* and out at the opening *f*, while the cylindrical cap will be raised from its seat and the water will flow around the piston D and out through the exit-opening B. In order to make a cushion effect, the cap C has an air-tight connection with the piston D, and the air-space *g* is controlled by a pipe *h*, extending through the piston and the bottom of the casting and provided with a cock *i*.

The flow of water may be regulated to the chamber O by the screw *k*, which is used to contract the passage *a*, as may be found desirable.

In Fig. 4 I have shown a modification in which the piston D is open at its upper end, and with this construction it may not be necessary to have the relief-valve, though I may use it or not, as may be found desirable. In this figure also instead of using the diaphragm connected at its edges its outer circumference simply overlaps the joint between the cap and the wall of the chamber, and this prevents leakage from the chamber O.

I claim—

1. In a valve, an inlet-passage and an outlet-passage, a piston arranged intermediate of the openings, a cylindrical cap surrounding the upper end of the piston, a diaphragm secured to said cap, a pressure-chamber above the diaphragm and means for controlling the pressure to said chamber, substantially as described.

2. In a valve, a stationary piston, a cylindrical cap surrounding the upper end thereof, the diaphragm secured thereto, a pressure-chamber above the diaphragm an inlet to said chamber, an outlet from said chamber and a valve controlling the inlet and outlet ports, substantially as described.

3. In a valve, a piston located intermediate of the inlet and outlet ports, a cylindrical cap closing the passage around the piston, a diaphragm secured to the cap and an air-chamber between the cap and piston, substantially as described.

4. In a valve, a valve-chamber, inlet and outlet passages, a centrally-located piston within the valve-chamber, and a cap guided by said piston and adapted to be moved in relation thereto, with a supplemental valve for controlling the movement of said cap, substantially as described.

5. In a valve, a valve-chamber, inlet and outlet passages, a piston, a cap guided by said piston and controlling the outlet of water, a pressure-chamber communicating with the inlet or pressure passage for keeping the cap normally closed and means for relieving the pressure in the pressure-chamber to cause the water to flow, substantially as described.

6. In a valve, a valve-chamber, inlet and outlet passages, a piston, a cap guided by said piston, an air-chamber between the cap and piston forming a cushion, means for controlling said cushion effect, a pressure-chamber communicating with the pressure side of the valve and a controlling-valve for relieving the pressure-chamber and causing the water to flow, substantially as described.

7. In a valve, a valve-chamber, inlet and outlet passages, a piston, a cap guided thereby and controlling the outlet of water, a pressure-chamber communicating with the pressure side for keeping the cap normally closed, an inlet-pipe entering said chamber, and a valve adapted to close the pressure-inlet and to open an exit for the escape of the contents of the pressure-chamber, substantially as described.

CHARLES GULLAND.

Witnesses:
J. A. WILSON,
JAMES SMITH.